United States Patent
Clark

(10) Patent No.: US 9,550,256 B2
(45) Date of Patent: Jan. 24, 2017

(54) USED PISTON PROCESSING AND REPAIR STRATEGIES FOR POPULATING REPLACEMENT PISTON INVENTORY

(71) Applicant: Caterpillar, Inc., Peoria, IL (US)

(72) Inventor: Donald G. Clark, Iuka, MS (US)

(73) Assignee: Caterpiller Inc., Peoria, IL (US)

( * ) Notice: Subject to any disclaimer, the term of this patent is extended or adjusted under 35 U.S.C. 154(b) by 459 days.

(21) Appl. No.: 14/098,861

(22) Filed: Dec. 6, 2013

(65) Prior Publication Data

US 2014/0166513 A1  Jun. 19, 2014

Related U.S. Application Data

(60) Provisional application No. 61/739,209, filed on Dec. 19, 2012.

(51) Int. Cl.
| | | |
|---|---|---|
| *B65D 85/68* | (2006.01) | |
| *B23P 6/02* | (2006.01) | |
| *F02F 3/00* | (2006.01) | |

(52) U.S. Cl.
CPC .. *B23P 6/02* (2013.01); *F02F 3/00* (2013.01); *B65D 85/68* (2013.01); *Y10T 29/4925* (2015.01)

(58) Field of Classification Search
CPC ........... B23P 6/02; F02F 3/00; Y10T 29/4925; B65D 85/68
USPC ........ 206/319; 53/428; 29/888.041, 888.042, 29/888.111; 92/172; 123/193.6
See application file for complete search history.

(56) References Cited

U.S. PATENT DOCUMENTS

| | | | | |
|---|---|---|---|---|
| 3,004,336 A | * | 10/1961 | Timuska | F02F 3/105 29/402.18 |
| 3,220,101 A | * | 11/1965 | Roy | B23P 15/10 29/401.1 |
| 4,722,440 A | * | 2/1988 | Johnston | B65D 71/70 206/319 |
| 5,450,784 A | * | 9/1995 | Shureb | F16J 1/02 123/193.6 |
| 6,318,551 B1 | * | 11/2001 | Calvert | B23P 6/02 206/319 |
| 6,462,459 B1 | * | 10/2002 | Kirkman | B65D 5/5038 206/319 |
| 6,779,660 B1 | | 8/2004 | Calvert et al. | |
| 2005/0028364 A1 | * | 2/2005 | Issler | B21K 1/18 29/888.042 |
| 2005/0132569 A1 | * | 6/2005 | Clark | B23P 6/02 29/888.041 |
| 2013/0032120 A1 | * | 2/2013 | Claver | F02F 3/022 123/193.6 |
| 2015/0013159 A1 | * | 1/2015 | Claver | B23P 6/02 29/888.011 |

\* cited by examiner

*Primary Examiner* — Luan K Bui

(57) ABSTRACT

Processing used pistons includes receiving defective and non-defective pistons removed from service, sorting the used pistons into standard and expanded processing categories, and repairing a defect in pistons in the expanded processing category via welding. An inventory of interchangeable replacement pistons is populated with remanufactured pistons from both the standard and expanded processing categories.

2 Claims, 3 Drawing Sheets

USED PISTON PROCESSING AND REPAIR STRATEGIES FOR POPULATING REPLACEMENT PISTON INVENTORY

RELATION TO OTHER PATENT APPLICATION

This application claims priority to provisional patent application 61/739,209, filed Dec. 19, 2012 with the same title.

TECHNICAL FIELD

The present disclosure relates generally to the field of remanufacturing, and relates more particularly to repairing a defective piston for populating an inventory of interchangeable replacement pistons.

BACKGROUND

The fields of machine component salvaging and remanufacturing have grown significantly in recent years. Systems and components that only recently would have been scrapped are now repaired and/or refurbished and returned to service. For many years machine components have routinely been "rebuilt" and used again, but often only after the component's dimensions or other features and properties are modified out of necessity from original specs. Increasing bore size during "rebuilding" on internal combustion engine will be a familiar example. It is more desirable in many instances, however, for systems and components to be remanufactured to a condition as good or better than new without modifying the specs. With this goal in mind, the development of remanufacturing strategies in certain technical areas and for certain classes of components has been rapid. In other areas, however, and in the case of certain types of machine parts, engineers continued to find it challenging to return components to a commercially and technically acceptable state, much less a condition identical to or better than new. Compounding these challenges is the tendency for even very precisely and carefully remanufactured components to still have an appearance of wear or prior use, which can lead to commercial challenges when so recognized by a potential consumer.

While all manner of techniques have been proposed for repairing cracks in components, removing corrosion, repairing surface finishes and other signs of prior use have been proposed over the years, the use of such techniques can change the material properties of the components, such as microstructure, in ways only apparent upon inspection with sophisticated instrumentation or after returning to service and observing a failure. Moreover, even where such techniques more than adequately address the technical requirements of remanufacturing, they can still render the component aesthetically unappealing. One class of machinery parts where balancing these sometimes competing goals of technical sufficiency and aesthetic appeal has proven quite challenging are internal combustion engine pistons.

Internal combustion engines have many different parts. When such an engine is taken out of service and dismantled for remanufacturing, various of the parts may be reused while others are scrapped. Reassembling an internal combustion engine once remanufactured therefore often requires the use of a mix of both remanufactured parts and new parts. In the case of pistons, it is commonplace for replacement pistons supplied for installation in a remanufactured engine to be new due to the fact that many incoming pistons removed from service are presumed to be poorly suited, if at all, for remanufacturing. U.S. Pat. No. 6,779,660 to Calvert et al. is directed to a method and apparatus for installing a prepackaged piston assembly. Calvert et al. proposed a prepackaged assembly in which a plurality of piston rings are preinstalled on a piston and a sleeve positioned about the piston and the rings to maintain the rings in a compressed position ready for installation. Calvert et al. indicate that their development reduces time and expense required for rebuilding an engine and increases the quality of the rebuild. While Calvert et al. may provide an advantageous strategy for packaging and supplying replacement pistons, the reference does not appear to provide any guidance as to obtaining the replacement piston itself from remanufactured or new sources.

SUMMARY

In one aspect, a method of processing used pistons includes receiving a collection of used pistons each removed from service in an internal combustion engine, and including a plurality of non-defective pistons, and a plurality of defective pistons each having a defect in an outer surface thereof. The method further includes sorting the collection of used pistons into a standard processing category for remanufacturing the non-defective pistons, an expanded processing category for remanufacturing defective pistons satisfying a defect weldability criterion, and a third category. The method further includes repairing the defect in each of the pistons in the expanded processing category at least in part by depositing welding filler material in a molten state onto a base material of the piston forming the defect, and machining the deposited filler material once bonded to the base material and solidified. The method still further includes populating an inventory of interchangeable replacement pistons with remanufactured pistons from both the standard and expanded processing categories but not the third category.

In another aspect, a method of preparing a used piston for returning to service in an internal combustion engine includes receiving a used piston sorted from a collection of used pistons on the basis of a defect in an outer surface thereof into an expanded processing category for remanufacturing. The method further includes repairing the defect at least in part by depositing welding filler material in a molten state onto a base material of the piston forming the defect, and machining the deposited filler material once bonded to the base material and solidified. The method still further includes forwarding the piston once repaired to an inventory of interchangeable replacement pistons populated from both the expanded processing category and a standard processing category for remanufacturing.

In still another aspect, an inventory of replacement pistons includes a plurality of standard pistons each including a remanufactured piston body having a skirt and an attached crown defining a combustion bowl surrounded by an annular piston rim, and being uniformly composed of a base material such that the standard pistons each have an identical material composition. The inventory further includes a plurality of non-standard pistons each including a remanufactured piston body having a skirt and an attached crown defining a combustion bowl surrounded by an annular rim. The piston bodies in the non-standard pistons are non-uniformly composed of the base material and a welding filler material bonded to the base material to repair a defect therein, and such that the non-standard pistons each have a unique material composition. Each of the standard and nonstandard pistons further include an outer surface on the corresponding piston body, and the outer surfaces satisfying a common set of specifications, such that the standard and non-standard pistons are interchangeable for returning to service in internal combustion engines.

DETAILED DESCRIPTION

Figure 1:
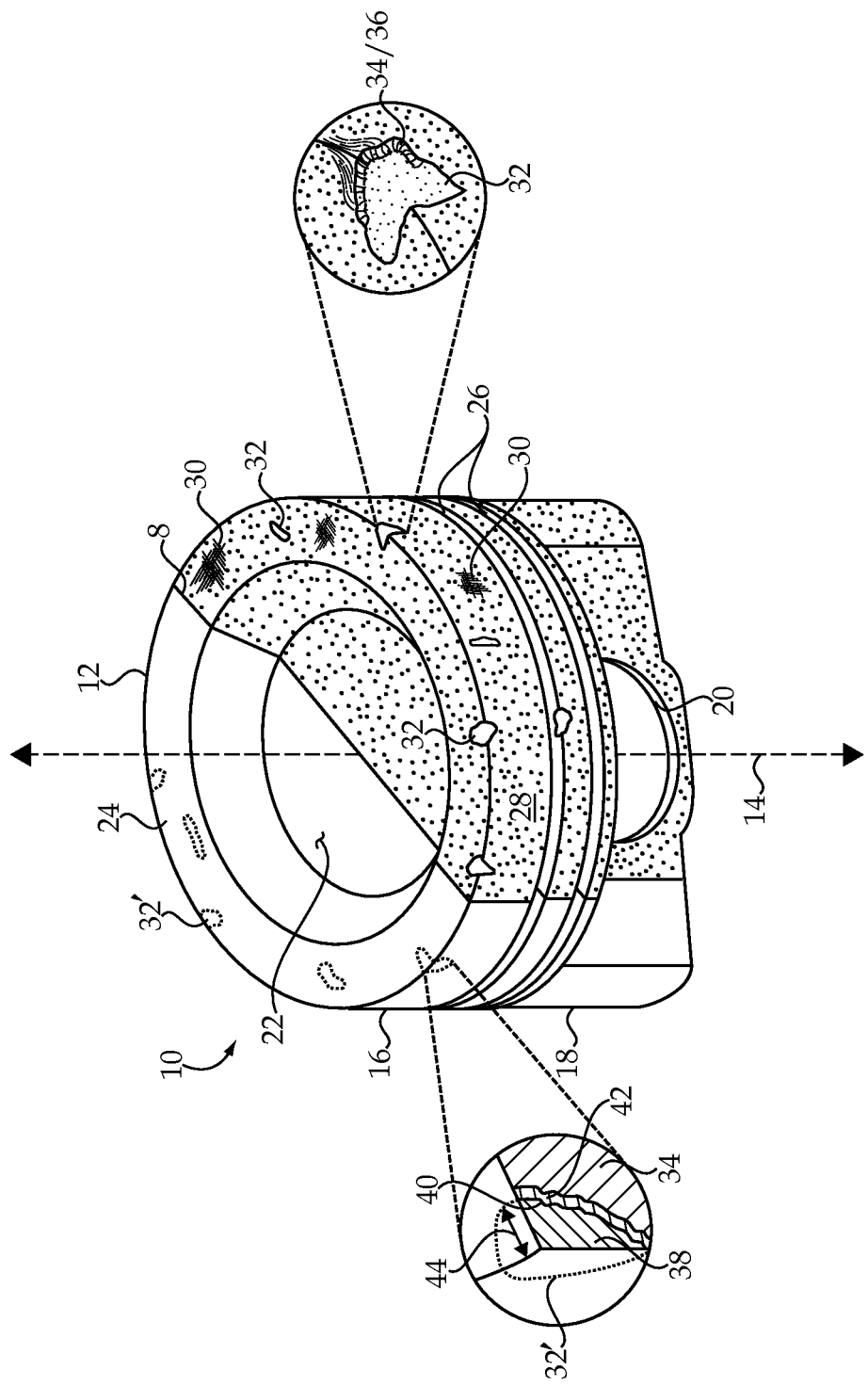
FIG. 1 is a diagrammatic before-and-after view of a piston showing one piston half prior to remanufacturing and the other piston half after remanufacturing according to the present disclosure.

Referring to FIG. 1, there is shown a piston 10 having a piston body 12, and having been removed from service in an internal combustion engine. In FIG. 1 a line 8 is shown on piston body 12. Piston body 12 is illustrated on the right side of line 8 as it might appear prior to being remanufactured according to the present disclosure, and depicted on the left side of line 8 as it might appear after having been remanufactured. Piston body 12 includes a piston crown 16 and a piston skirt 18 and defines a longitudinal axis 14. A wrist pin bore 20 extending normal to axis 14 is formed in skirt 18 and configured to receive a wrist pin for coupling piston body 12 with a piston rod in a conventional manner. A combustion bowl 22 is formed in crown 16 and is surrounded by an annular rim 24 circumferential of axis 14. A plurality of piston ring grooves 26 are formed in an outer surface 28 of piston body 12 within crown 16, and also extend circumferentially around longitudinal axis 14. To the right side of line 8 are shown a plurality of corroded areas 30 and a plurality of defects 32. Defects 32 may have the form of dings, dents, pits or scratches, for example. A detailed enlargement of one of the defects 32 is also shown in FIG. 1. Upon or after removing a used piston from service, during handling or processing pistons can sometimes be banged against parts of the engine being dismantled, against each other in a salvage pile, or otherwise strike something with sufficient force to cause damage. In some instances, defects 32 may be formed by a base material 34 of piston body 12 which is displaced, meaning not actually removed, by striking the piston against something else. In FIG. 1, displaced base material 36 is shown in the detailed enlargement, having been pushed out of its intended location to create a void. In other instances, base material 34 might not be merely displaced but instead chipped, cut or flaked away to form a void. In either case, the presence of the void can violate specifications as to surface finish of a new or as good as new piston. For reasons which will be apparent from the following description, repair of these and other types of defects with sufficient quality that a piston can be returned to original specifications has long been elusive.

On the left side of line 8 in FIG. 1 are shown a plurality of repaired defects 32', one of which is shown in a sectioned view by way of another detailed enlargement. As noted above, piston body 12 may be formed of a base material 34 which is the cast metallic material such as steel or iron used in originally manufacturing the piston. Defects 32 may be repaired during remanufacturing piston 10 at least in part by depositing welding filler material 38 in a molten state onto base material 34 which forms the defect, and machining deposited filler material 38 once bonded to base material 34 and solidified. In FIG. 1, repaired defects 32' will typically not be visible to the naked eye, and are thus shown in phantom. A bondline 40 resides between solidified filler material 38 and base material 34 and adjoins a heat affected zone 42. A depth 44 of repaired defect 32' showed in the detailed enlargement is also illustrated, and in certain embodiments may be about 2.0 millimeters (mm) or less. The other dimensions of repaired defect 32', height and width, might also be about 2.0 mm or less. As used herein, the term "about" should be understood in the context of conventional rounding to a consistent number of significant digits. Accordingly, "about" 2.0 mm means from 1.95 mm to 2.04 mm, and so on. A thickness of heat affected zone 42 may be about 0.2 mm or less in certain embodiments.

Those skilled in the field of remanufacturing will be familiar with the general principle of returning a used component to a condition as good as or better than new. For remanufactured parts a set of specifications such as tolerances and surface finishes known from newly manufactured parts will typically be applied to the remanufacturing of used parts. In the present instance, piston 10 is remanufactured such that it satisfies the same set of specifications as that of a new piston. Among these specifications may be surface finish. While quantitative surface finish specifications are contemplated herein, in many instances, the surface finish specification relied upon might be qualitative, prescribing the existence of no defects or anomalies in surface finish visible to the naked eye when a piston is at arm's length, for example, or for that matter at any distance, from an observer. As noted above, the manner of repairing defects in piston body 12 to satisfy such a specification contemplates depositing welding filler material 38 onto base material 34.

In the illustrated case shown by way of the detailed enlargements in FIG. 1, the defects repaired may be understood as specification-violating voids in outer surface 28 within crown 16. Corroded areas 30 may also be understood as specification-violating defects, and in some instances might be deposits of foreign material on piston body 12, corroded base material of piston body 12, base material which is corroded and pitted to a porous state, or still another feature. In other words, corroded areas 30 might themselves be understood in certain instances as specification-violating voids where porous, and thus repaired via the deposition of welding filler material, but in other instances might be defects that are repaired by some other technique not requiring the addition of filler material. Practical examples of suitable repair techniques will be further understood by way of the following description.

Figure 2:
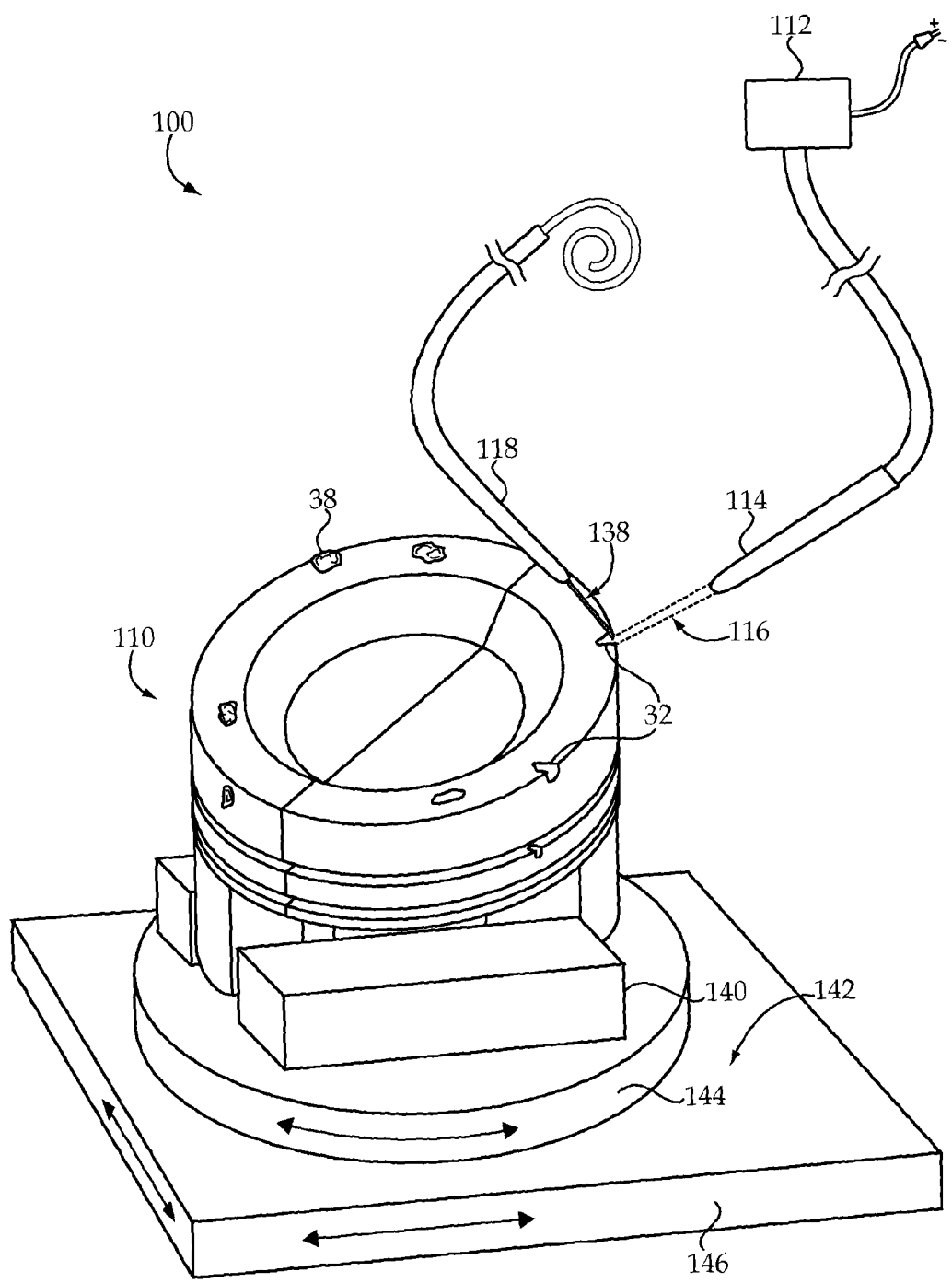
FIG. 2 is a diagrammatic view of a piston at an example stage of remanufacturing, according to one embodiment.

Referring now to FIG. 2, there is shown a piston 110 similar to piston 10 of FIG. 1 and positioned at a welding station 100 as it might appear in the process of being repaired. While piston 110 may be of the same type as piston 10, each defective piston repaired according to the techniques described herein can be expected to have a unique set of one or more defects. Accordingly, since welding filler material will be deposited onto base material to repair the unique set of defects, defective pistons once repaired may be understood to each have a unique material composition comprised of the base material of the piston plus welding filler material in unique locations and/or unique amounts and/or of unique shapes. In contrast, used pistons which are remanufactured without welding repair as described herein may be formed solely of the base material and thus have identical material compositions.

In FIG. 2, piston 110 is shown positioned upon a fixture 140 of welding station 100. Fixture 140 may be coupled to a positioning mechanism 142 having a rotatable base 144 and a translatable support 146 which enable piston 110 to be rotated and translated relative to a laser 114 of welding station 100. Laser 114 may have a power supply 112 and is configured to generate a beam 116 which by its heat energy melts welding filler material in the form of a wire 138. Wire 138 is shown fed through a wire feeder 118 but could also be positioned appropriately by hand. It may be noted that beam 116 is oriented such that a defect 32 currently being repaired is within a beam path of beam 116. Wire 138 is likewise within the beam path such that beam 116 melts both base material of piston 110 and wire 138, to deposit the welding filler material in a molten state into defect 32 where it is allowed to solidify and bonds with the base material.

In FIG. 2, solidified welding filler material 38 is shown having been deposited within a plurality of repaired, although not yet finished, defects in piston 110, while a number of other defects 32 have not yet been welded. In a practical implementation strategy, a power output of laser 114 may be less than 100 watts, and beam 116 may be pulsed for a pulse duration less than 20 milliseconds (ms). More particularly, the power output may be about 60 watts, the pulse duration may be about 10 ms at a frequency of about 2 Hz, and a beam diameter of laser 114 may be about 2 mm or less. Once a defect is welded as described herein, piston 110 may be adjusted via positioning mechanism 142 to locate another defect for welding until each of the defects in piston 110 have been welded. Piston 110 may then be forwarded to a subsequent processing station for further treatment.

INDUSTRIAL APPLICABILITY

Figure 3:
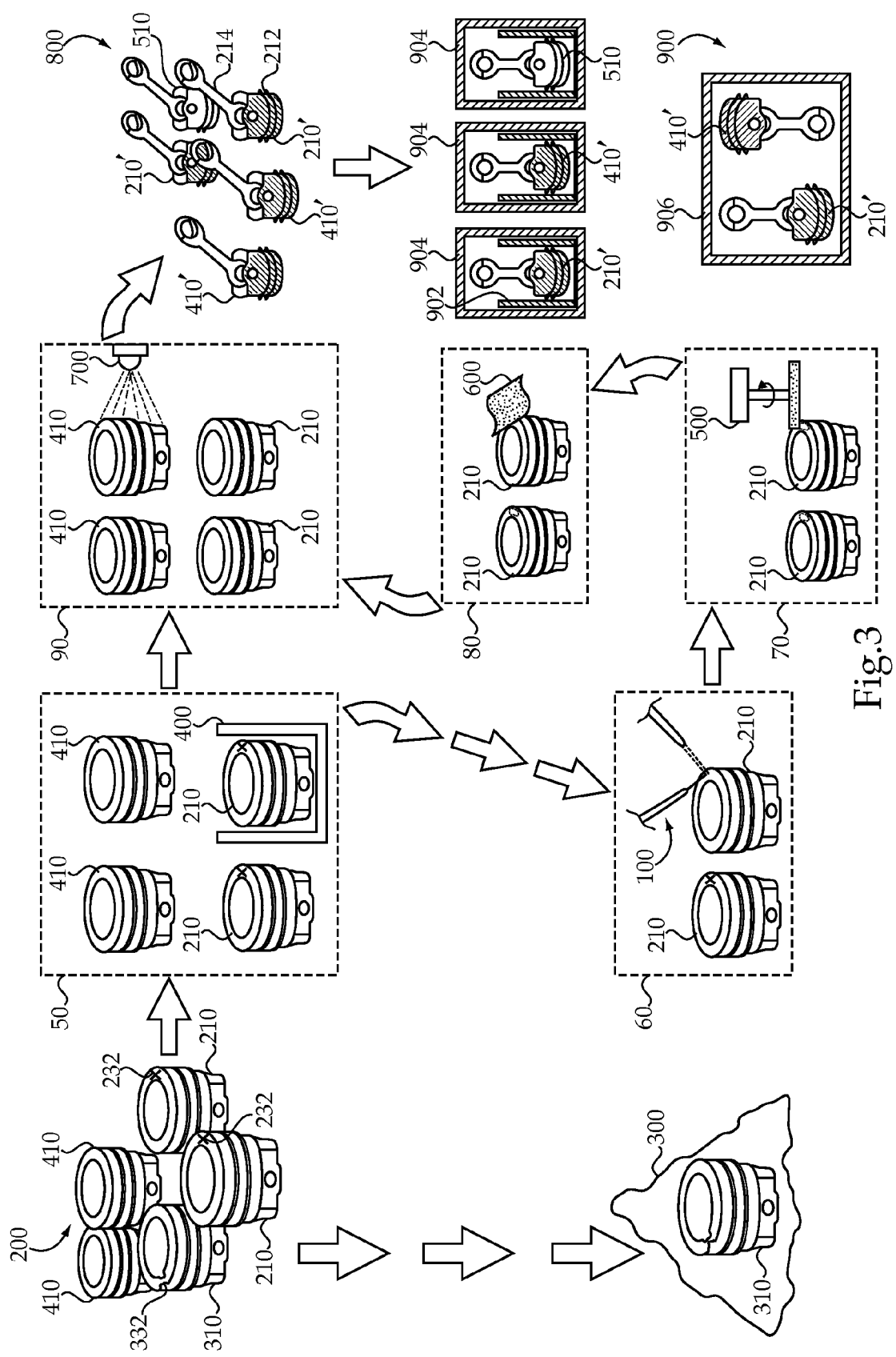
FIG. 3 is a diagrammatic view illustrating multiple stages of a piston processing strategy, according to one embodiment.

Referring to FIG. 3, there is shown a diagrammatic illustration of multiple stages of a used piston processing strategy for populating an inventory of interchangeable replacement pistons, according to one embodiment. The procedures depicted in FIG. 3 commence by receiving a collection 200 of used pistons each removed from service in an internal combustion engine, which might be the same engine or multiple engines. Receiving collection 200 may include receipt of a shipment, or taking custody of warehoused pistons, for example. Collection 200 may include a plurality of non-defective pistons 410, and a plurality of defective pistons 210 and 310 each having a defect in an outer surface thereof. As discussed above, when pistons are removed from an internal combustion engine, it is common for handling of some of the pistons to cause dings, scratches, dents, etc. in outer surfaces of the pistons. Pistons 210 in collection 200 each include such a defect 232, and piston 310 includes a more significant defect 332. Other pistons received have no defects and are shown as non-defective pistons 410 in collection 200.

In preparation for processing, collection 200 may be sorted into a standard processing category for remanufacturing the non-defective or standard pistons 410, an expanded processing category for remanufacturing defective or non-standard pistons satisfying a defect weldability criterion, and a third category. Sorting of collection 200 may be understood as dividing collection 200 among the three categories on the basis of whether there is a defect in a given piston at all, and if so, whether the defect is amenable to repair via the welding techniques set forth herein. In the case of piston 310 defect 332 may be determined upon inspection to be not amenable to the present repair techniques, thus fails to satisfy the defect weldability criterion and sorted into the third category for routing to scrap. A scrap collection 300 of defective pistons is shown in FIG. 3 receiving piston 310. With pistons failing to satisfy the defect weldability criterion sorted out, the other pistons in collection 200 which are non-defective, pistons 410, may undergo standard processing for remanufacturing, while the defective pistons, pistons 210, which need to and can be repaired may undergo expanded processing.

In any case, pistons 410 and 210 sorted from collection 200 may next be forwarded to a processing stage 50 for cleaning. At stage 50, one of pistons 210 is shown within a cleaning mechanism 400 which might be a washer, grit blaster or some other cleaning mechanism. After processing at stage 50, pistons 210 may be forwarded to another processing stage 60 for repairing the defects at welding station 100 in the manner described herein. Once repaired, from stage 60 pistons 210 may be forwarded to another processing stage 70 for machining the welded defects via a machining mechanism 500. From stage 70, pistons 210 may be forwarded to yet another processing stage 80 at which a sanding mechanism 600, which could be manual use of sandpaper or the like, is used to blend the machined areas treated at stage 70. From stage 80, pistons 210 may be forwarded to yet another processing stage 90. Pistons 410 may be forwarded from processing stage 50 to processing stage 90 to be combined with pistons 210. In stage 90 all of pistons 410 and 210 may be treated via a spraying mechanism 700 to apply a suitable, known break-in coating.

FIG. 3 represents only some of the various processing stages that might be used, and additional steps of inspection, cleaning and possibly repair of other types of defects might be implemented. It will nevertheless be apparent that pistons 210 will be forwarded through an expanded series of processing stages as compared with pistons 410, hence, pistons 210 are remanufactured according to a non-standard series of processing stages whereas pistons 410 are processed according to a standard series of processing stages having a lesser number of steps than the non-standard series. By way of analogy, collection 200 may be thought of as a pool which is divided into a first stream of non-repairable pistons flowing to scrap, a shorter remanufacturing stream for pistons needing only minimal processing to be made ready for returning to service, and a longer remanufacturing stream for pistons which need repairing before they are ready for returning to service. The shorter and longer streams split after stage 50, and recombine at stage 90 at which point the non-defective pistons and the repaired defective pistons are interchangeable for returning to service and are outwardly indistinguishable.

From stage 90, pistons 410 and 210 may be forwarded to populate an unpackaged inventory 800 of interchangeable replacement pistons, each shown as a piston assembly. In particular, unpackaged inventory 800 is shown having a plurality of remanufactured piston assemblies 210' each having piston rings 212 and a piston rod 214 coupled with the corresponding remanufactured piston. Piston assemblies 410' are shown which each include one of pistons 410 and also piston rings and a piston rod. Inventory 800 might of course consist of loose pistons. Also populating unpackaged inventory 800 is a new piston assembly 510. In a practical implementation strategy, unpackaged inventory 800 will thus be populated with remanufactured pistons from both the standard and expanded processing categories, but not the third, scrap category. Inventory 800 may also be populated with at least one new piston or piston assembly.

It will be recalled that pistons repaired according to the techniques described above, non-standard pistons 210, may each have a unique material composition, resulting from welding filler material being used to repair a unique pattern of defects. Since the standard pistons, pistons 410, are not repaired in such a way, each of pistons 410 may be understood to have an identical material composition. Outer surfaces of the piston bodies in each of the standard and non-standard pistons, that is the standard and expanded processing categories, may nevertheless appear identical to the outer surfaces of the non-standard pistons 210, as they are formed to satisfy a set of specifications common with that for the outer surfaces of the standard pistons. As a result, both standard pistons 410 and non-standard pistons 210 once remanufactured are interchangeable for returning to service in internal combustion engines, both from the standpoint of expected performance and aesthetic appearance.

Also shown in FIG. 3 is a packaged inventory 900 of piston assemblies. In a practical implementation strategy, packaged inventory 900 may include a first group of engine service packages 904 containing both standard and non-standard pistons as parts of piston assemblies 210' and 410' in a first service package configuration, and a second group of engine service packages 906 also containing both standard and non-standard pistons as parts of piston assemblies 210' and 410' in a second service package configuration. In certain embodiments, the first group of service packages 904 may include both standard and non-standard pistons in the piston assemblies each packaged with a cylinder liner 902 to form a ready-for-installation cylinder pack. Service packages 904 and 906 may each also include one or more service packages containing new piston assembly 510.

It will be recalled that sorting of defective pistons 210 from defective pistons 310 in collection 200 may occur based upon whether defects in these various pistons satisfy a defect weldability criterion. Those skilled in the art will be familiar with the desirability of machine repairs having as little effect as practicable on the composition, and thus ultimately on the integrity and expected service life of a part being repaired. To this end, it has been discovered that certain defects can be successfully and economically repaired via the present repair techniques, while others cannot. In one embodiment, the defect weldability criterion includes a defect size limit. The defect size limit may be an upper size limit of a defect, which is indicative of the expected size of a heat affected zone to be formed in the defective piston via the presently described welding repair techniques. In other words, defects having a certain size may be associated with heat affected zones which are too large to allow the piston to be practicably made ready for returning to service. As noted above, a size of defects repaired according to these techniques may be about 2.0 mm or less, as it has been determined that larger defects may result in a heat affected zone too large to give confidence that the piston can be reliably returned to service without any undue risk of failure, or be otherwise impractical to repair.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An inventory of replacement pistons comprising:
   a plurality of standard pistons each including a remanufactured piston body having a skirt and an attached crown defining a combustion bowl surrounded by an annular piston rim, and being uniformly composed of a base material such that the standard pistons each have an identical material composition;
   a plurality of non-standard pistons each including a remanufactured piston body having a skirt and an attached crown defining a combustion bowl surrounded by an annular rim;
   the piston bodies in the non-standard pistons being non-uniformly composed of the base material and a welding filler material bonded to the base material to repair a defect therein, and such that the non-standard pistons each have a unique material composition;
   each of the standard and non-standard pistons further including an outer surface on the corresponding piston body, and the outer surfaces satisfying a common set of specifications, such that the standard and non-standard pistons are interchangeable for returning to service in internal combustion engines, wherein the outer surfaces of each of the standard and non-standard pistons are located on the crown of the corresponding piston body; and
   further comprising a first group of engine service packages containing both standard and non-standard pistons in a first service package configuration, and a second group of engine service packages containing both standard and non-standard pistons in a second service package configuration.

2. The inventory of claim 1 wherein the second group of engine service packages contains both standard and non-standard pistons in a plurality of piston assemblies each packaged with a cylinder liner to form a cylinder pack, and a new piston also packaged with a cylinder liner and a piston rod to form a cylinder pack.

* * * * *

UNITED STATES PATENT AND TRADEMARK OFFICE
CERTIFICATE OF CORRECTION

PATENT NO. : 9,550,256 B2  
APPLICATION NO. : 14/098861  
DATED : January 24, 2017  
INVENTOR(S) : Donald G. Clark Page 1 of 1

It is certified that error appears in the above-identified patent and that said Letters Patent is hereby corrected as shown below:

On the Title Page

Column 1, Item (73) (Assignee), Line 1, delete "Caterpiller Inc.," and insert -- Caterpillar Inc., --.

Signed and Sealed this  
Ninth Day of May, 2017

Michelle K. Lee  
*Director of the United States Patent and Trademark Office*